(No Model.)
M. KING.
BLOWER.
No. 407,404. Patented July 23, 1889.
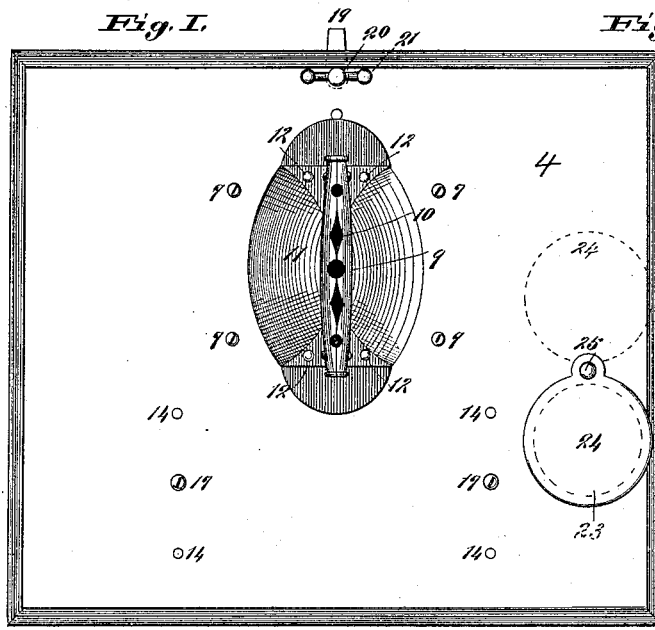
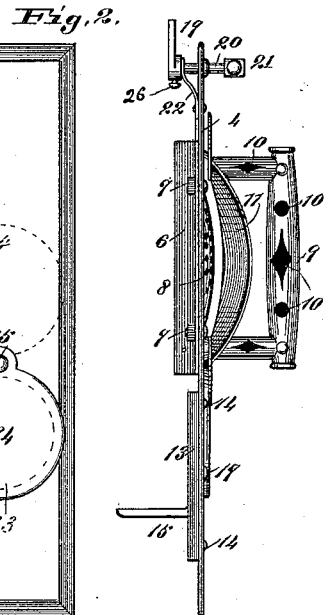
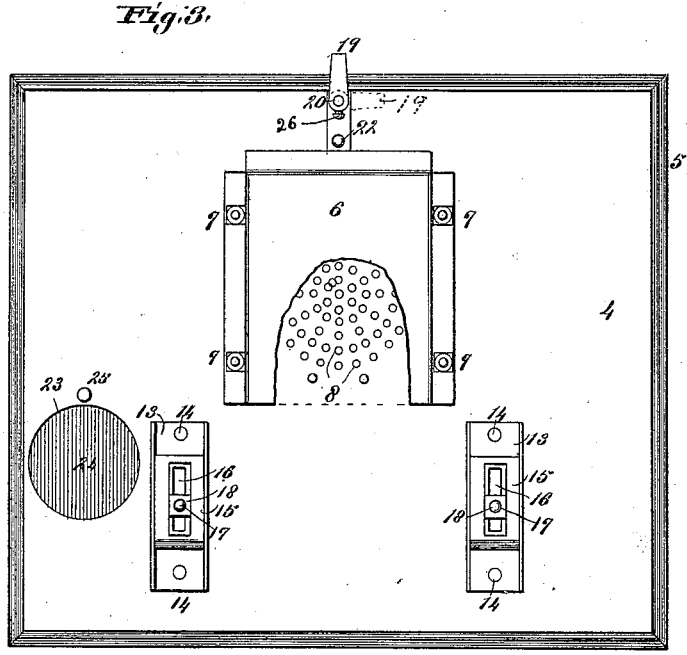
Witnesses:
Charles Pickles,
G. N. Hinchman Jr.
Inventor:
Molesworth King,
By Fowler & Fowler
Attorneys

United States Patent Office.

MOLESWORTH KING, OF CHICAGO, ILLINOIS, ASSIGNOR OF ONE-HALF TO LOUIS E. LAFLIN, OF SAME PLACE.

BLOWER.

SPECIFICATION forming part of Letters Patent No. 407,404, dated July 23, 1889.

Application filed February 1, 1889. Serial No. 298,384. (No model.)

*To all whom it may concern:*

Be it known that I, MOLESWORTH KING, a citizen of the United States, residing at Chicago, county of Cook, and State of Illinois, have invented certain new and useful Improvements in Blowers for Fire-Grates, of which the following is such a full, clear and exact description as will enable any one skilled in the art to which it appertains to make and use the same, reference being had to the accompanying drawings, forming part of this specification.

Figure 1 is a front elevation of a blower made in accordance with my invention. Fig. 2 is a side elevation thereof; and Fig. 3 is a rear elevation showing a part thereof broken away.

The same figures of reference indicate the same parts throughout the different views.

4 is the blower, which is preferably made with a beveled edge 5. Upon the back of the blower is a shield 6, which is struck up from metal and secured to the blower, preferably by bolts 7. This shield is attached to the blower on the rear side, directly back of where the handle is secured. A space is thereby left between the body of the blower 4 and the shield 6 for air to circulate through. The part of the blower that is covered by the shield 6 is provided with a multiplicity of perforations 8, in order to permit the air of the room to circulate through the perforations in the space between the shield 6 and the body of the blower, so as to keep this part of the blower as cool as possible.

9 is the handle, which is secured to the front of the blower, anterior to the shield 6. Said handle is hollow, and is preferably provided with any number of holes 10, whereby the air of the room may circulate through said handle and keep it cool. Secured to the blower at some distance from the front thereof, anterior to the shield 6, is a second shield 11, which is secured to said blower by bolts 12. This second shield may be made in any desired shape and configuration, so as to make the blower more attractive, and may be ornamented in any manner. The shield 11 being secured to the blower at some distance therefrom, a circulation of air is permitted to take place between said second shield 11 and the blower through the perforations 8, before mentioned. The purpose of the second shield is to protect the handle and hand when taking hold of the handle by intercepting the radiation of heat from the blower. The hollow handle 9 is, although made of metal, kept cool by the perforations in it and by the effect of the two shields referred to.

13 13 are two channel-irons, which are secured to the blower, preferably by means of bolts 14. Preferably in these channel-irons are adjustably secured angle-irons 15 15, the upright part of which is provided with slots 16, through which bolts 17 pass, the ends of the same being provided with nuts 18, which secure said angle-irons in position. These angle-irons constitute adjustable lugs for supporting the blower when put in place, so that the blower can be made to suit almost any fire-place.

The upper part of the blower is provided with a catch 19, which is journaled upon a spindle 20, that passes through the blower, and is provided with a handle 21.

26 is a screw, by which the catch 19 may be adjustably secured along the spindle 20, so as to accommodate any fire-place. Against the catch 19 bears a spring 22, secured to the rear of the blower. This spring allows the spindle 20 to rotate, but holds it in whatever position it is left. The catch locks the blower in position when adjusted in the required place.

23 is an opening, which is cut preferably to one side of the blower near the lower part thereof. Said opening is provided with a door 24, which is preferably secured to the blower by means of a pin 25, so that the door 24 can be revolved about the pin to open and close said opening. When taking ashes from the grate, much dust is liable to be created, which flies about the room and settles upon the furniture and carpets. The object of the opening 23 is to obviate this. If, for instance, when taking the ashes from the grate, the door 24 be moved in the position shown by dotted lines in Fig. 1, so as to uncover the opening, and the mouth of the coal-hod, in which the ashes are to be placed, be arranged adjacent to the opening 23, the draft through said opening will be such as to cause the dust to pass through the same up the chimney or onto the fire. When the ashes have been collected, the door 24 is closed, and the blower now performs all the functions of a blower the same as if there were no opening in it.

My improvements add but little to the cost of a blower and are valuable in securing the results noted above. Various changes may be made in my invention without departing from the spirit of the same. For instance, one of the shields might be dispensed with if found advisable and the shield 11 made in one or more pieces. I do not wish therefore to confine myself to exactly what is shown and described herein.

What I desire to claim as new, and secure by Letters Patent as my invention, is—

1. The combination, with a blower, of the hollow handle 9, the shield 6, secured to the rear of the blower back of the handle 9, and the perforations 8 in said blower between the handle and the shield 6, substantially as described.

2. The combination, with a blower, of the hollow handle 9, and the shield 11, secured to said blower between the same and the handle, there being a multiplicity of perforations 8 in the part of the blower covered by said shield.

3. The combination, with a blower, of the perforated handle 9, the shield 6, secured to the rear thereof, a second shield 11, secured to said blower between the same and the handle, and a multiplicity of perforations in that part of the blower covered by said shield, substantially as described.

4. A blower for fire-grates, having a catch 19, and a spindle 20, passing through the blower, along which spindle said catch is adjustable, whereby the catch may be adjusted to suit any fire-place.

5. A blower for fire-grates, having a catch 19, a spindle 20, passing through the blower, along which spindle said catch is adjustable, a handle 21 for said spindle upon the outside of the blower, and a spring 22, secured to the blower and bearing upon said spindle, whereby the catch may be adjusted to suit any fire-place and will be held in whatever position it is placed.

In testimony whereof I have hereunto set my hand and affixed my seal, this 25th day of January, 1889, in the presence of two subscribing witnesses.

MOLESWORTH KING. [L. S.]

Witnesses:
LOUIS E. LAFLIN,
ELIAS R. BOWEN.